United States Patent
Panico et al.

(10) Patent No.: US 7,150,806 B2
(45) Date of Patent: Dec. 19, 2006

(54) SPIRAL-SHAPED LAMP FOR UV CURING OF COATINGS AND BONDING FOR A DIGITAL VERSATILE DISK (DVD) OR COMPACT DISK (CD)

(75) Inventors: C. Richard Panico, Medford, MA (US); Louis R. Panico, Danver, MA (US)

(73) Assignee: Xenon Corporation, Woburn, MA (US)

( * ) Notice: Subject to any disclaimer, the term of this patent is extended or adjusted under 35 U.S.C. 154(b) by 0 days.

(21) Appl. No.: 10/055,251

(22) Filed: Jan. 11, 2002

(65) Prior Publication Data
US 2003/0010435 A1    Jan. 16, 2003

Related U.S. Application Data

(63) Continuation of application No. PCT/US99/26188, filed on Nov. 4, 1999.

(60) Provisional application No. 60/107,057, filed on Nov. 4, 1998.

(51) Int. Cl.
*B29C 65/02* (2006.01)

(52) U.S. Cl. ............... 156/380.9; 250/492.1; 250/493.1; 250/494.1; 250/504 R

(58) Field of Classification Search ............ 156/379.6, 156/380.9; 250/504 R, 504 H, 492.1, 493.1, 250/494.1; 313/484; 428/64.2; 362/216
See application file for complete search history.

(56) References Cited

U.S. PATENT DOCUMENTS

| 2,472,597 | A | * | 6/1949 | Levy | 362/216 |
| 2,814,721 | A | * | 11/1957 | Fry | 362/216 |
| 4,027,185 | A | | 5/1977 | Nodwell et al. | 313/35 |
| 4,112,335 | A | | 9/1978 | Gonser | 315/241 |
| 4,167,669 | A | | 9/1979 | Panico | 250/341 |

(Continued)

FOREIGN PATENT DOCUMENTS

JP    09087592    3/1997

(Continued)

OTHER PUBLICATIONS

Panico, L., "Rapid Curing of Small Area Industrial Cements in Close Proximity," AFE Technical Paper, Association for Finishing Processes of the Society of Manufacturing Engineers, 1980.

(Continued)

*Primary Examiner*—Jeff H. Aftergut
*Assistant Examiner*—John L. Goff
(74) *Attorney, Agent, or Firm*—Wilmer Cutler Pickering Hale and Dorr LLP

(57) ABSTRACT

A spiral-shaped lamp (10) is used for disk manufacturing processes, such as curing of coating or bonding, to provide uniform intensity of UV energy to the circular disk without requiring relative motion between the disk and the lamp during the curing process.

5 Claims, 2 Drawing Sheets

U.S. PATENT DOCUMENTS

| | | | | |
|---|---|---|---|---|
| 4,229,568 A | | 10/1980 | Wada et al. | 528/500 |
| 4,255,383 A | | 3/1981 | Schenck | 422/24 |
| 4,309,617 A | | 1/1982 | Long | 250/504 |
| 4,443,533 A | | 4/1984 | Panico | 430/311 |
| 4,495,040 A | * | 1/1985 | Panico | 204/155 |
| 4,871,559 A | | 10/1989 | Dunn et al. | 426/248 |
| 4,917,751 A | | 4/1990 | Ohta et al. | 156/272.2 |
| 5,051,665 A | | 9/1991 | Garrison et al. | 315/287 |
| 5,204,517 A | | 4/1993 | Cates et al. | 250/205 |
| 5,443,033 A | | 8/1995 | Nishizawa et al. | 117/86 |
| 5,512,123 A | | 4/1996 | Cates et al. | 156/272.6 |
| 5,568,007 A | | 10/1996 | Yamura et al. | 313/35 |
| 5,569,928 A | | 10/1996 | Lee et al. | 250/494.1 |
| 5,613,509 A | | 3/1997 | Kolb et al. | 134/56 |
| 5,684,778 A | * | 11/1997 | Yamada et al. | 369/100 |
| 5,708,324 A | | 1/1998 | Anandam et al. | 313/493 |
| 5,780,860 A | | 7/1998 | Gadgil et al. | 250/432 |
| 5,785,793 A | | 7/1998 | Arai et al. | 156/272.2 |
| 5,904,795 A | | 5/1999 | Murakami et al. | 156/275.5 |
| 5,928,575 A | * | 7/1999 | Buazza | 264/1.38 |
| 6,017,603 A | | 1/2000 | Tokuda et al. | 428/64 |
| 6,030,653 A | * | 2/2000 | Rosenthal | 426/248 |
| 6,228,332 B1 | | 5/2001 | Dunn et al. | 422/186.3 |
| 2002/0166043 A1 | * | 11/2002 | Panico | 713/1 |
| 2002/0186014 A1 | * | 12/2002 | Panico et al. | 324/360 |

FOREIGN PATENT DOCUMENTS

| | | |
|---|---|---|
| JP | 10036777 | 2/1998 |

OTHER PUBLICATIONS

Panico, L., "Flash Polymerization," AFE Technical Paper, Association for Finishing Processes of the Society of Manufacturing Engineers, 1976.

Panico, L., "Xenon's Rapid Curing Process," SME Technical Paper, Society of Manufacturing Engineers, 1975.

Yearwood, C., "Evaluation of Rapid Cure Composite Systems," Organic Materials Branch, Materials and Manufacturing Technology Division, Army Armament Research and Development Command, 1981.

"Joining Procedure for Magnetic Disk Files in Portable Computers," TDB Intellectual Property Network , 1993.

"Photomagnetic Catalysis: Innovative Curing Technology," Futuretech, 1987.

Panico, L., "Pulsed UV Curing," Xenon Corporation, no date.

"1977 Product Guide," Xenon Corporation, 1977.

* cited by examiner

SPIRAL-SHAPED LAMP FOR UV CURING OF COATINGS AND BONDING FOR A DIGITAL VERSATILE DISK (DVD) OR COMPACT DISK (CD)

CROSS-REFERENCE TO RELATED APPLICATION

This application claims priority from provisional application Ser. No. 60/107,057, filed Nov. 4, 1998, which is incorporated herein by reference.

BACKGROUND OF THE INVENTION

The manufacturing of compact disks (CDs) and digital versatile (or video) disks (DVDs) for computer and video applications can include a number of processes, such as bonding in the case of DVDs and overcoat curing in either case, in which pulsed ultraviolet (UV) light can be used in the manufacturing process. The UV light source for providing the pulsed UV energy may be an arc lamp filled with xenon gas, thus generating significant UV energy.

It is known that a lamp with a linear elongated lamp shroud or tube can be used to generate the UV light energy for processing such disks. The use of such an elongated lamp requires relative motion of the lamp with respect to the circular disk during manufacture in order to expose the disk to the UV energy in a uniform manner.

SUMMARY OF THE INVENTION

According to the present invention, a lamp with at least one circular turn, and preferable in a spiral configuration, is used for disk manufacturing processes that utilize pulse UV light to provide a uniform intensity of UV energy to the circular disk, without requiring relative motion between the disk and the lamp during the processing (although there would be relative motion when the disk is brought to a processing station that has the UV light). The invention thus includes a system for processing a CD or DVD including a spiral lamp, and a method for curing a CD or DVD with a spiral lamp. (For simplicity, such a video or computer disk will be referred to generally here as a DVD.)

A contoured reflector can be provided to increase the intensity of the UV energy onto the disk surface and to make it more uniform. Another mirror can be used to help direct energy to the edge of the DVD for edge curing, as it has been found that this is an area that may not be sufficiently cured, especially in DVDs here two sides are bonded together. The mirrors and reflectors thus can reflect and diffuse the UV energy more uniformly across the disk surface and direct the energy where desired.

The lamp can have one or more turns lying in one plane parallel to the workpiece, or the lamp can have turns in different planes parallel to the workpiece. Alternatively, the lamp can be in two or more parts with an inner ring or spiral and a separate outer ring or spiral, which may or may not be in the same horizontal plane as the inner ring. The different planes can be employed to help provide uniformity and to make sure a sufficient amount of energy gets to the edge and periphery.

The spiral lamp improves edge curing while also minimizing thermal buildup. The use of a spiral also avoids the need to move the DVD relative to the lamp during processing. Other features and advantages will become apparent from the following detailed description, drawings, and claims.

DESCRIPTION OF PREFERRED EMBODIMENTS

Figure 1:
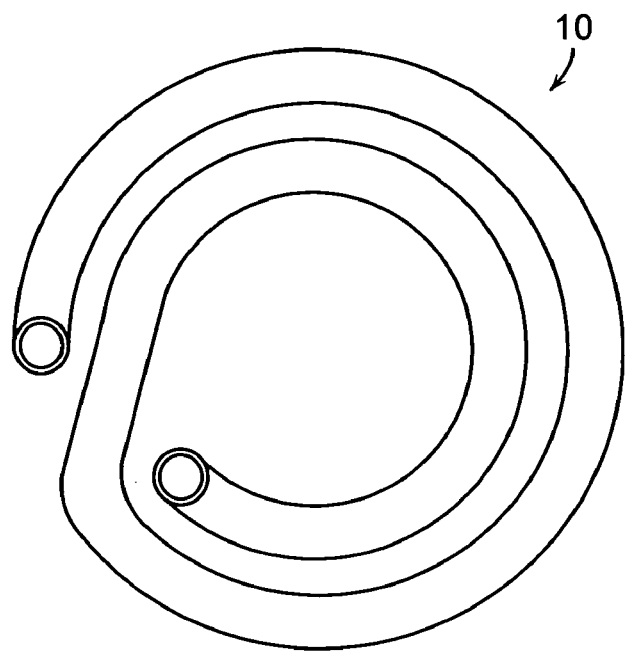
FIGS. 1 and 2 are a plan view and a side view of a spiral lamp according to the present invention.
Figure 2:
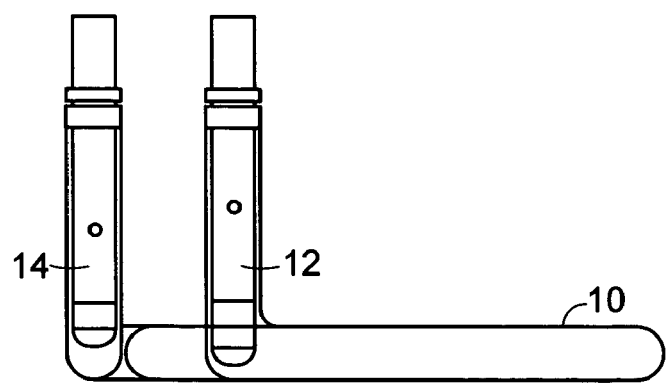

Referring to FIGS. 1 and 2, a spiral-shaped lamp 10 is used for curing a CD or DVD (again, such computer and video disks are referred to her collectively and generally as DVDs) during manufacture, such as when two parts of the DVD are bonded together, or when an overcoat (e.g., graphics on a disk) is to be cured. UV light is useful in such processes for providing curing of a bonding agent or an overcoat without providing excessive heat, a known benefit of pulsed light. Lamp 10 has an anode end 12 and a cathode end 14 for connection to an energy supply.

As shown in FIG. 1, lamp 10 is shaped in a spiral and is centered over the DVD in such a way that it provides minimal energy in the center of the disk where there is a hole and an unrecorded area, but more energy over the rest of the DVD. The spiral shape continues to the outer diameter of the disk area. FIG. 1 shows a total of two turns, although a single ring would be possible and more turns could be used. In addition, it would be possible to have concentric rings that do not form a single monolithic lamp unit. The spiral or other circular shape improves uniformity of the applied light as compared to a linear lamp.

In a preferred embodiment, the diameter of the lamp, from cathode end 14 to an opposite side of the lamp can range from about 4 to 6 inches, a suitable diameter for use in curing a DVD, which is about 4.75 inches. In one embodiment, the lamp has a greater diameter than the DVD to help promote curing at the edge, although the diameter may be less. The lamp could also have energy providing portions in different parallel planes relative to the workpiece.

Figure 3:
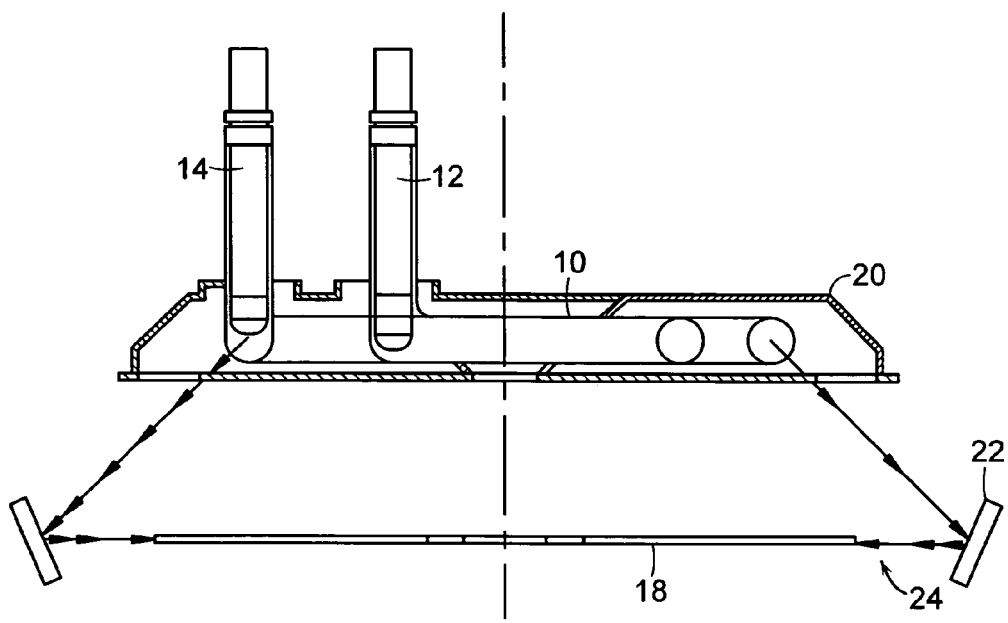
FIG. 3 is a part side view, part cross-sectional view of a lamp, a workpiece, a reflector, and another mirror.

Referring to FIG. 3, lamp 10 is shown over a DVD 18. Over lamp 10 is a contoured mirror 20 preferably configured so that the energy that is provided to the DVD is substantially uniform over the whole surface while providing little energy in the center where the DVD has a hole. The exact contour can be determined as needed to obtain the desired uniform energy on the DVD.

Another mirror 22 can also be provided to help direct energy to the edge of the DVD as shown along path 24, thus providing additional energy to ensure curing at the edge.

Figure 4:
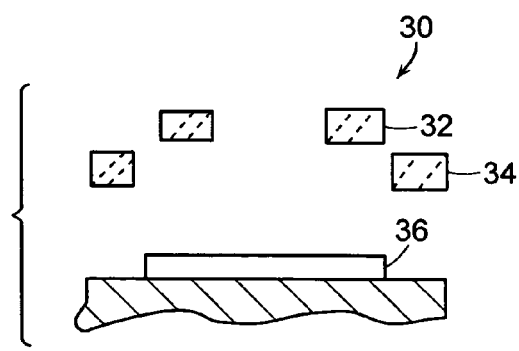
FIG. 4 is a cross-sectional view of a lamp according to another embodiment of the invention.

Referring to FIG. 4, a lamp 30 can have a first ring 32 and a second ring 34 (and possibly additional rings) that lie in different planes in a direction parallel to a workpiece 36. Rings 32 and 34 can be spaced apart and energized separately, or they can be connected like a spiral in a manner as shown in FIGS. 1 and 2. The reflectors and mirror as in FIG. 3 can also be provided. This configuration can be desirable for ensuring sufficient energy at the periphery of the DVD.

As indicated above, it is known in the art that DVDs can be cured with pulsed UV light, and thus one of skill can establish parameters for operation, such as energy, energy density, pulse width, pulse time, etc based on the materials used to make the disk, the process to be performed, and the other factors, such as a particular adhesive that may be used.

Having described certain embodiments of the present invention, it should be apparent that modifications can be made without departing from the scope of the appended claims.

What is claimed is:

1. A system for processing a DVD comprising a pulsed lamp for directing pulsed ultraviolet light to the DVD, the lamp having a configuration with at least one circular turn, wherein the DVD lies in a first plane, and the lamp has first and second rings that are separately energized, each of the first and second rings being in a different plane with each in a plane parallel to the DVD.

2. A system comprising:
   a DVD lying generally in a first plane and having a hole in the center;
   a pulsed lamp for directing pulsed light to the DVD for processing the DVD during manufacture, the lamp having a configuration with at least one circular turn and lying in a second plane parallel to the first plane, wherein the pulsed lamp includes a first ring, therein a second ring, the first and second rings being concentric having different radius, and separated; and
   a contoured reflector positioned to reflect light from the lamp to the DVD, the reflector being configured to provide less light to the center of the DVD where the hole is located and more light to the periphery of the DVD.

3. The system of claim 2, wherein the second ring has a greater diameter than the first ring and is positioned closer to the DVD than the second ring.

4. The system of claim 1, wherein the first and second rings have a different radius.

5. The system of claim 2, wherein the processing includes curing an adhesive in the DVD.

* * * * *

UNITED STATES PATENT AND TRADEMARK OFFICE
CERTIFICATE OF CORRECTION

PATENT NO. : 7,150,806 B2  Page 1 of 1
APPLICATION NO. : 10/055251
DATED : December 19, 2006
INVENTOR(S) : Richard C. Panico et al.

It is certified that error appears in the above-identified patent and that said Letters Patent is hereby corrected as shown below:

In Claim 2, column 4, line two after "first ring" delete ", therein" and insert --and--.

Signed and Sealed this

Twenty-fourth Day of April, 2007

JON W. DUDAS
*Director of the United States Patent and Trademark Office*